Sept. 16, 1941. H. S. ORTH ET AL 2,256,216
METHOD AND APPARATUS FOR FORMING CLAY PRODUCTS
Filed Nov. 3, 1938 3 Sheets-Sheet 1
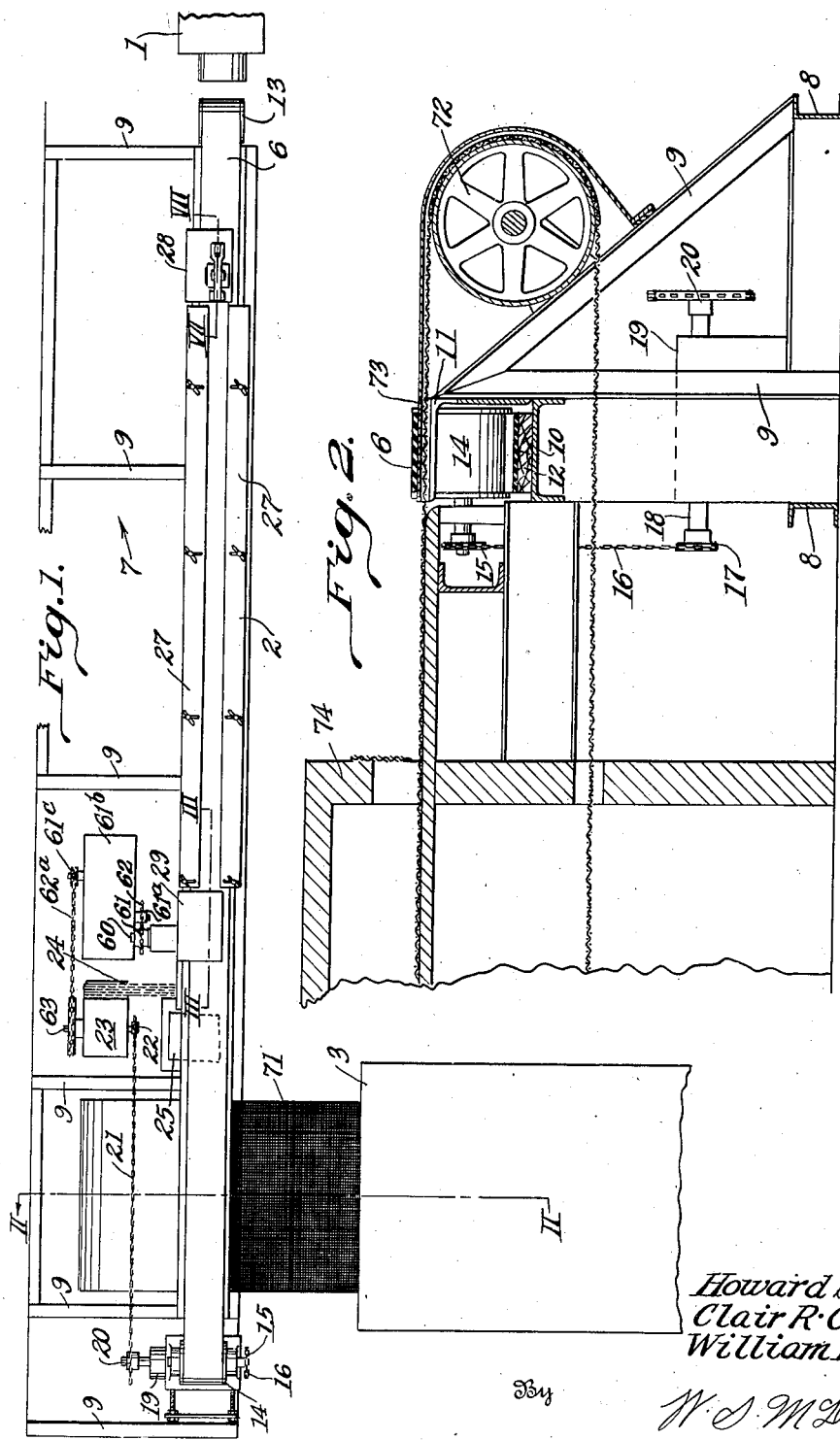
Inventors
Howard S. Orth
Clair R. Oberst
William E. Cramer
By
W. S. McDowell
Attorney Sept. 16, 1941.    H. S. ORTH ET AL    2,256,216
METHOD AND APPARATUS FOR FORMING CLAY PRODUCTS
Filed Nov. 3, 1938    3 Sheets-Sheet 2

Inventors
Howard S. Orth
Clair R. Oberst
William E. Cramer
By W. S. M. Howell
Attorney

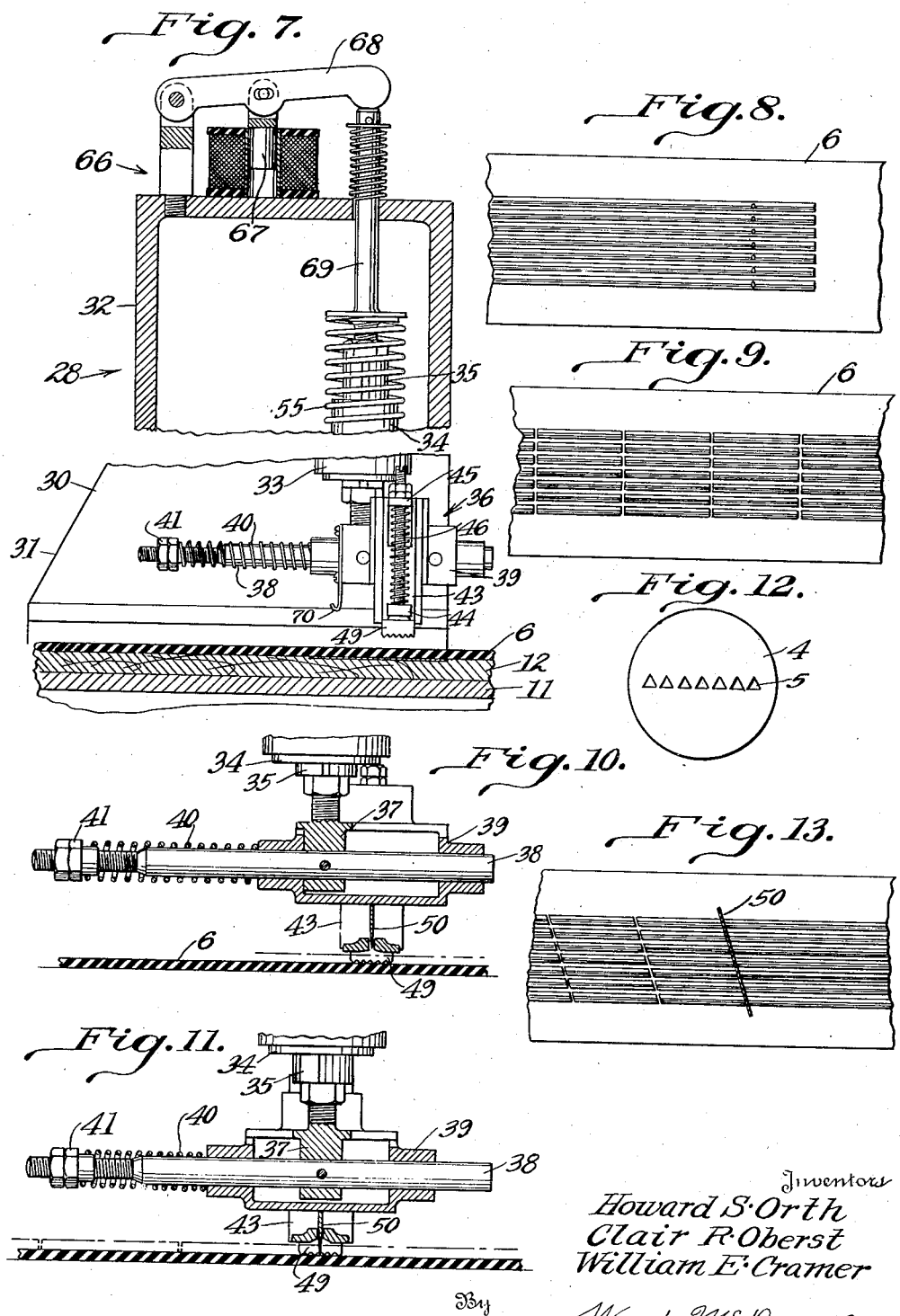

Patented Sept. 16, 1941

2,256,216

UNITED STATES PATENT OFFICE 2,256,216

METHOD AND APPARATUS FOR FORMING CLAY PRODUCTS

Howard S. Orth, Clair R. Oberst, and William E. Cramer, Columbus, Ohio, assignors to Industrial Ceramic Products, Inc., Columbus, Ohio, a corporation of Ohio Application November 3, 1938, Serial No. 238,576

21 Claims. (Cl. 25—105)

This invention relates to mechanism for forming articles from clay. In its more particular aspects, the invention relates to an improved method and apparatus for forming sagger pins of the type used in the manufacture of ceramic ware.

Prior to this time, sagger pins have been manufactured by slow laborious methods which do not lend themselves to quantity production nor to the provision of structurally perfect articles. The primary object of the invention is in the provision of a machine which will produce high quality pins in large quantities with a minimum amount of relatively unskilled labor and a consequently moderate cost.

It is also an object of the invention to provide a method of forming sagger pins wherein the process of formation will be substantially continuous from the time the clay is put into the extruding machine until it is discharged as a finished product, requiring substantially no manual handling during this time.

An object also resides in providing a device for automatically cutting a plurality of strands of clay into equal length sections while the material is positioned on a continuously moving conveyor, each of the sections having end surfaces which are perfectly normal to the longitudinal axis thereof.

A still further object resides in the construction of a sagger pin forming machine having a continuously moving conveyor adjacent to which is positioned a cutting device, the latter being provided with a cutting blade movable through a body of material on the conveyor and having means to engage the conveyor whereby the cutting blade will move in the same direction and at the same speed as the conveyor while passing through the material thereon. This provision insures the production of uniform end surfaces on the articles produced by the machine.

An object also rests in providing a horizontally arranged conveyor in alignment with the discharge end of an extruding machine to receive the column of clay issuing therefrom, the conveyor being driven at a greater linear speed than that of the clay column and having a pair of cutters spaced longitudinally thereof, the cutter nearest the extruding machine being intermittently actuated to sever portions of the clay column from that issuing from the extruding machine to permit the portions to be carried along by the conveyor, the second cutter being continuously actuated to cut the severed portions into a multiplicity of equal length sections.

Further objects will be apparent from the following description and the accompanying drawings in which the invention in its preferred form has been illustrated.

In the drawings:

Fig. 1 is a diagrammatic plan view of the arrangement of machines for carrying out the present invention;

Fig. 2 is a vertical sectional view taken through the discharge end of the cutting machine and the receiving end of the drying mechanism;

Fig. 7 is a vertical longitudinal sectional view taken through the primary cutter of the machine, the plane of this section being indicated by the line VII—VII of Fig. 1;

Fig. 8 is a plan view of a portion of the conveyor in the cutting machine provided with a clay column after it has been severed from the extruding machine;

Fig. 9 is a similar view showing the clay column after it has passed the second cutter;

Fig. 10 and Fig. 11 are longitudinal sectional views taken through the second cutting head and showing it in different stages of operation;

Fig. 12 is a front elevation of the die used in the outlet of the extruding machine.

Fig. 13 is a plan view of a portion of the cutting machine conveyor provided with strands of clay which are being cut by an angularly disposed knife to form pins adapted for special use.

Figure 3:
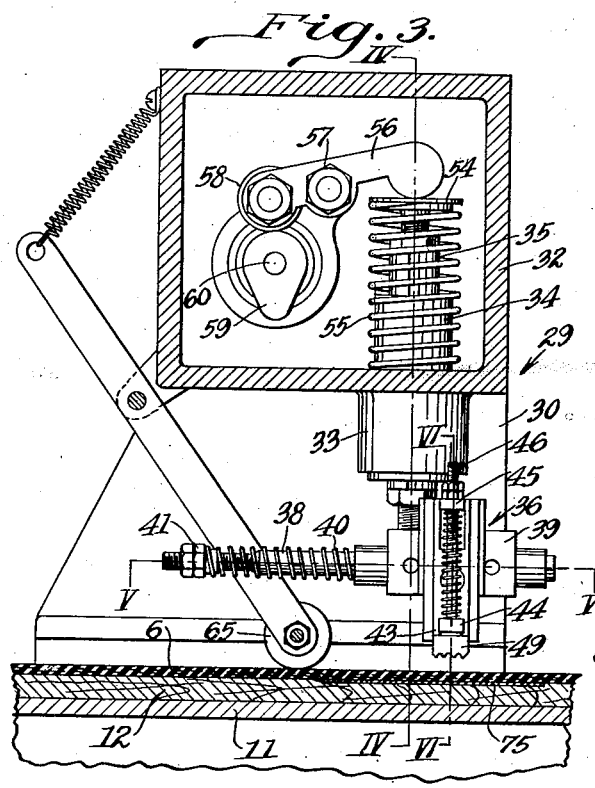
Fig. 3 is a vertical longitudinal sectional view taken through one of the cutting heads of the cutting machine, the plane of the section being indicated by the line III—III of Fig. 1.
Figure 4:
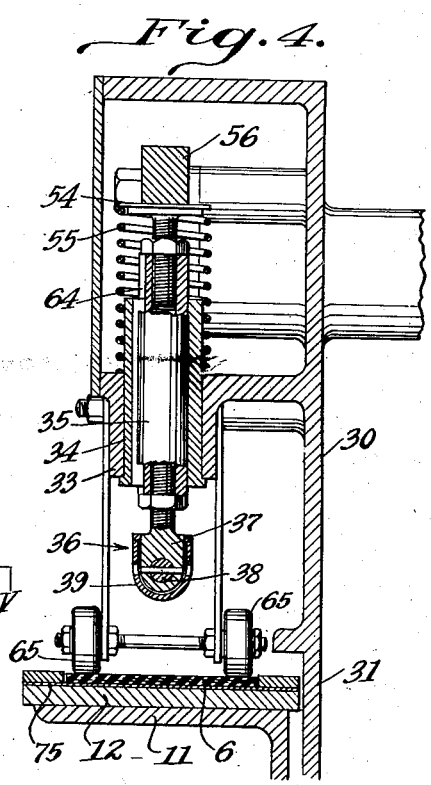
Fig. 4 is a vertical transverse sectional view taken on the plane indicated by the line IV—IV of Fig. 3.
Figure 5:
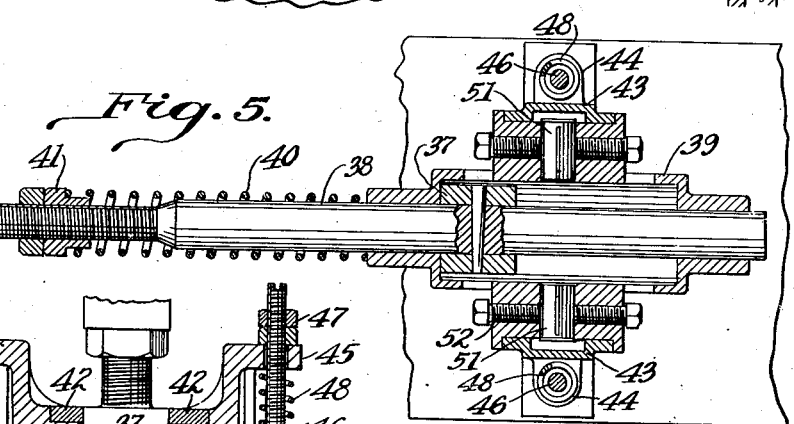
Fig. 5 is a detail horizontal sectional view taken on the plane indicated by the line V—V of Fig. 3.
Figure 6:
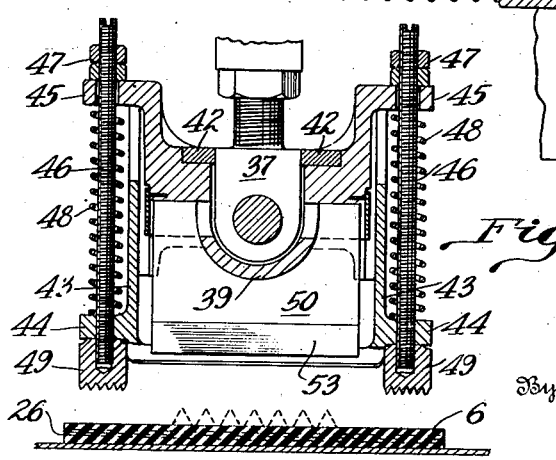
Fig. 6 is a vertical transverse sectional view taken through the knife holding mechanism, the plane of this section being indicated by the line VI—VI of Fig. 3.

Referring more particularly to the drawings, and specifically to Fig. 1, it will be noted that the system includes an extruding machine 1, a cutting machine 2 and a drying kiln 3. The extruding machine and the drying kiln do not form the subject matter of the invention but are merely indicated generally since their arrangement with relation to the cutting machine enters into the method.

The extruding machine includes a die 4 having a plurality of triangular outlet openings 5 through which the clay, from which the sagger pins are formed, is extruded. The power to force the clay through the openings is provided by means of a motor driven auger, not shown. The outlet end of the extruding machine is disposed in alignment with the forward end of the cutting machine 2 which includes a conveyor having a belt 6 onto which the strands of clay, issuing from the openings 5, are discharged.

The conveyor is supported in registration with the outlet of the extruding machine by a frame 7 which includes base channels 8 having vertically extending angle members 9 secured thereto. The upper ends of the angle members support a pair of platforms 10 and 11 formed from structural steel or other suitable material. The platforms carry wooden strips 12 over which the conveyor belt 6 is adapted to move. The strips are highly polished in order to offer the least resistance to the movement of the belt thereover. At the ends of the platforms, the framework is provided with pulleys 13 and 14 around which the endless belt is trained. The pulley 14 is supported on an axle to the outer end of which is secured a sprocket 15. A link chain 16 extends around the sprocket 15 and a second sprocket 17 is carried by one end of a horizontal shaft 18 journaled for rotation in a bearing 19 and having its opposite end equipped with a larger sprocket 20. An endless chain 21 extends from the sprocket 20 to a smaller sprocket 22 provided with a gear transmission 23.

Power is supplied to the transmission 23 by means of a belt 24 leading from an electric motor 25. By varying the diameters of the pulleys for the belt 24, the rate of linear travel of the conveyor may be varied. The belt 6, as illustrated in the drawings, is formed to include a center fabric section 26 having upper and lower rubber layers secured thereto. To prevent slippage between the belt and the pulleys, the latter are provided with rubber sleeves. It is essential that lost motion between the pulleys and the belt be eliminated since the mechanism for cutting the clay strands is driven in timed relation to the belt by the same driving mechanism.

The upper platform has guide plates 27 adjustably secured thereto to keep the strands of clay moving in the proper relation to the cutting devices provided adjacent the belt. There are two cutting devices provided, the cutter 28 being disposed adjacent to the receiving end of the conveyor and the cutter 29 being mounted in spaced relation to the cutter 28 and each include a supporting member 30. The supporting members have plates 31 which are bolted or otherwise secured to the conveyor frame and include bodies 32 at their upper ends. The bodies are boxlike in construction and have their lower portions formed to include a boss 33 having a vertically extending opening provided therein. A guide sleeve 34 is positioned in each of the openings to receive and support a plunger member 35. The first cutter is intermittently operated in order to sever a portion of the clay strands from the body issuing from the extruding machine. Each of the cutters include a knife holder assembly 36 carried in connection with the vertically movable plungers 35. The ends of the plungers include threaded bores, the bore in the lower end of the plunger receiving the threaded stem of the knife holder supporting block 37.

By adjusting a nut positioned on the stem of the block, the knife holder assembly may be moved toward or away from the conveyor belt to accommodate clay strands of varying height. The lower end of the block 37 includes a horizontally extending bore in which is fixedly secured a guide pin 38 which extends parallel to and in the same direction as the conveyor and slidably receives the knife holder 39. A coil spring 40 is disposed between one end of the knife holder and a nut 41 carried by the rear end of the guide bar 38. By means of this construction, the knife holder is free to slide on the bar 38 but is resiliently held in a position at the forward end thereof by the spring 40. Pivotal movement of the holder around the axis of the guide bar is prevented by the engagement of the upper edges thereof with the sides of the block 37. Suitable wearing plates 42 are disposed at this point and are removably carried by the holder so that the plates may be readily removed or replaced to compensate for wear.

The holder 39 is provided at its sides with guideways extending at right angles to the guide 38 to receive a stripper member 43. This element is U-shaped and has its lower laterally extending portion positioned below the knife holder. The vertical portions adjacent the lower end are provided with lugs 44 which, when the stripper member is positioned in the guides on the member 39, are in vertical registration with similar lugs 45 formed with the latter member at the upper ends of the guides. The lugs on the stripper member are provided with threaded openings for the reception of limit bars 46. The upper portions of these bars extend through clearance openings formed in the lugs 45 and have stop nuts 47 provided thereon. By adjusting the nuts 47, the movement of the stripper member in response to springs 48 positioned between the lugs 44 and 45 will be limited. The lower ends of the limit bars receive conveyor engaging feet 49, the lower knurled bottom surfaces of which are placed below the under surface of the stripper member.

In the center of the cross bar of the stripper member, there is formed a longitudinally extending slot through which the cutting blade 50 is adapted to move. This blade, at its upper end, straddles the body of the holder and is positioned in a pair of clamp blocks 51. Set screws 52 are received within the body of the knife holder and serve to hold the clamp blocks in knife supporting position. The lower end of the knife is chamfered as at 53 to provide a sharp clay-cutting edge. When the knife blade is in an inactive position, the sharpened edge portion will be disposed in a plane above the lower surface of the U-shaped stripper member.

In operation, the knife holder is lowered until the knurled extremities of the feet 49 engage the conveyor belt. When this occurs, the movement of the conveyor belt will be imparted to the knife holder and it will move in opposition to the spring 40. Continued downward movement will cause the blade 50 to move through the slot in the stripper member and into engagement with the upper surface of the conveyor belt. When clay strands are positioned on the belt, the knife will pass completely therethrough and cut the strand into a plurality of pieces. As the holder moves up on the return stroke, the knife will be withdrawn from the clay strands and continued movement will then withdraw the feet 49 from engagement with the conveyor. As soon as the feet are disengaged from the conveyor, the spring 40 will move the knife holder to a normal position.

It will be noted that the cutting operation is performed at the same time longitudinal movement is taking place on the part of the conveyor and that the knife will pass through the material on the conveyor in a predetermined plane. In the form shown, the plane of movement of the knife is at right angles to the plane of movement of the conveyor.

To secure vertical movement of the knife holder, the plunger 35 has its upper end provided with a mushroom head 54 between which and the lower wall of the body 32, there is positioned a coil spring 55. This coil spring serves to hold the plunger and the mechanism carried thereby in a normal elevated position. Downward movement in opposition to the spring is transmitted to the plunger by means of a rocker arm 56 pivoted to the rear wall of the body at 57. Movement is imparted to the rocker arm through the engagement of a roller 58 carried at one end thereof with a cam 59 formed on the end of a shaft 60 journaled with the body 32.

The outer end of the shaft 60 carries a sprocket 61 to which motion is imparted by means of a chain 62 passing around it and another sprocket 61a provided on a shaft extending from a variable speed transmission 61b. Power is supplied to the latter transmission by a chain 62a trained around a second sprocket 61c forming a part of the transmission 61b, and a larger sprocket 63 provided in connection with the gear transmission 23. When the shaft 60 rotates, repeated downward thrusts will be imparted to the plunger through the engagement of a raised portion on the cam 59 with the roller 58 carried by the rocker arm 56. After each downward movement, the plunger will be returned to an elevated position by means of the spring 55. To prevent misalignment of the guide 38 with respect to the conveyor belt, the plunger is keyed as at 64 to a guide sleeve 34. Any tendency of the belt to be raised by the movement of the conveyor engaging feet 49 away therefrom will be resisted by the spring pressed rollers 65 carried with the cutter member.

The construction of the first cutter member is substantially the same as the cutter member described in the foregoing with the exception of the mechanism for causing its actuation. The first cutter member, that is, the one positioned nearest the receiving end of the conveyor, is provided with a solenoid 66 on the upper portion of the body 32. The movable core 67 of the solenoid is connected to the intermediate portion of a pivoted lever 68, the outer free end of which engages an extension 69 formed on the upper end of the mushroom head. When the field coil of the solenoid is energized, the core will be drawn downwardly and similar movement will be imparted to the outer end of the lever 68. This will impart similar movement by means of the extension 69 to the plunger and the cutting mechanism carried by its lower end will be moved to operative position. This cutter is intermittently operated and is under the manual control of the attendant of the extruding machine.

The knife holder on the first cutter has a plate 70 mounted adjacent the cutting blade and is spaced vertically therefrom a slight distance to lightly engage the upper portions of the clay strands severed by the knife. As this plate engages the clay strands, it will press them firmly into contact with the belt in order to make the strands move in unison therewith. The speed at which the conveyor moves is greater than that of the body of the clay as it is extruded from the first machine. Thus, when the first machine cuts the strands from the portion issuing from the extruding machine, the section just cut will move quickly away from the end of the portion still connected with the machine and into position to be operated upon by the second cutter. Prior to being severed from the machine, slippage between the strands and the conveyor will take place. This slippage tends to hold the clay strands in an extended condition and imparts a slight stretch thereto. After the strands have passed through the second cutter, they will be in the form of a plurality of relatively short equal length sections as illustrated in Fig. 9.

As the conveyor moves past the receiving end of a second conveyor forming part of the drying mechanism, the relatively short sections of clay are moved laterally onto the second conveyor. This is the only manual operation to be performed directly on the clay between the time the clay is inserted into the extruding machine and the removal of the finished sagger pins from the delivery end of the drying kiln. The second conveyor, designated by the numeral 71, is formed of woven wire and passes around a pulley 72 carried by the framework of the cutting machine. The upper strand of the conveyor 71 moves beneath the upper strand of the conveyor 6, the wooden slat at this portion being replaced by a metallic plate 73 to permit the conveyor 71 to be positioned in close relationship to the first conveyor. This provides a minimum drop of the sagger pins in their transfer from the first to the second conveyor. The second conveyor moves through a tunnel drier kiln 74 where the clay products are subjected to drying temperatures.

The cycle of operation is as follows:

The clay is inserted into the extruding machine where it is subjected to kneading and air extracting operations. It is then extruded from this machine through the die having openings corresponding to the cross sectional configuration of the pins to be formed. The extruded lengths of clay are received by the forward end of the conveyor forming a part of the cutting machine. When a predetermined length of the strands has passed beyond the first cutter, a switch is actuated to complete the circuit to the solenoid on the first machine, causing the knife blade to pass through the strands to sever a length therefrom and secure it to the conveyor. As this strand passes beneath the second cutter, the continued operation thereof will sever the strand into a plurality of equal length sections which, as the conveyor moves past the second conveyor, will be transferred thereto. They will then move with the second conveyor through the heated drier kiln where all the moisture will be extracted. The drying may take several hours and the speed of the second conveyor is regulated accordingly.

It will be noted from Fig. 1 that the second cutting device is operated by the same driving mechanism used in operating the cutting machine conveyor. This synchronizes the operation of these two devices so that the sections cut by the second cutter will be of uniform length. Greater motion of the knife blade of the second cutter may be attained by replacing the cam 59 with a more suitable cam. This is done when the size of the sagger pins being formed is changed.

A wearing plate 75 is disposed beneath the belt in registration with the cutters to prevent undue wear by the engagement of the feet 49 with the belt.

In some instances, as when ceramic articles are being provided with a heavy glaze, special pins are required. These pins have an end surface thereof disposed at an angle to the longitudinal axis of the pin. When it is desired to form such a pin with the machine forming the subject matter of this invention, the knife blade 50 of the second cutting head is placed at an angle to the longitudinal center of the conveyor belt. Thus, when the clay strands are operated upon by the cutter, a series of angular cuts will be produced, as indicated in Fig. 13, and the sagger pins will be provided with angularly disposed end surfaces which are parallel with one another. To position the knife blade in the angular position, a special holder may be provided or the one illustrated may be formed with means to adjustably support the blade.

While we have shown and described the invention in its preferred form, it is understood that numerous changes may be made in the construction of the various parts as well as their operation and we reserve the rights to such changes as may be said to fall within the scope of the appended claims.

We claim:

1. The method of forming sagger pins comprising the steps of extruding a column of clay onto a conveyor belt which is moving at a greater speed than said column, severing a portion of said column therefrom to make it move in unison with said belt and thereafter cutting the severed portion of said column transversely into a plurality of equal length sections while on the said conveyor belt and in motion therewith.

2. The method of forming sagger pins comprising the steps of extruding a column of clay onto a conveyor belt which is moving at a greater speed than said column, severing a portion of said column therefrom to make it move in unison with said belt, cutting the severed portion of said column transversely into a plurality of equal length sections while on the said conveyor belt and in motion therewith, and passing said sections through a drying kiln.

3. The method of forming sagger pins comprising the steps of extruding a column of clay onto a conveyor belt which is moving at a greater speed than said column, severing a portion of said column therefrom to make it move in unison with said belt, simultaneously moving a knife longitudinally with respect to and at the same rate of speed as said belt and repeatedly passing the knife through said column while the same is carried by said belt to sever the column into a plurality of equal length sections, and passing said sections through a drying kiln.

4. The method of forming sagger pins comprising the steps of extruding a column of clay onto a conveyor belt which is moving at a greater speed than said column, simultaneously severing a portion of said column therefrom and pressing the severed portion on said belt to make it stick thereon and move in unison therewith, simultaneously and repeatedly moving a knife with said belt and through the severed portion of said column to sever it into a plurality of equal length sections while on said belt, and passing said sections through a drying kiln.

5. Mechanism for forming sagger pins comprising an extruding machine having a die with an opening conforming to the cross sectional configuration of the pins to be formed, a conveyor belt leading from the outlet of said machine, the longitudinal axis of said conveyor being substantially parallel with the longitudinal axis of the opening in said die, a manually controlled cutter provided adjacent to the conveyor at the end nearest said machine, and a second cutter positioned adjacent to said conveyor in spaced relation to said first cutter, said second cutter being synchronized for operation with said belt to produce a series of equally spaced cuts in material on said belt.

6. Mechanism for forming sagger pins comprising a machine for extruding an elongated clay body having a cross-sectional configuration of the pins to be formed, a conveyor belt leading from the outlet of said machine and receiving said clay body with the longitudinal axis thereof substantially parallel to that of the conveyor, means for continuously driving said conveyor at a speed greater than the clay body is extruded from said machine, a manually controlled cutter provided adjacent to the conveyor at the end nearest said machine to sever a portion of the clay body therefrom, and a second cutter positioned adjacent to said conveyor in spaced relation to said first cutter, said second cutter being actuated by the conveyor driving mechanism to produce a series of equally spaced cuts in the clay body positioned on and moving with said conveyor.

7. Mechanism for forming sagger pins comprising a machine for extruding an elongated clay body having a cross-sectional configuration of the pins to be formed, a conveyor belt leading from the outlet of said machine and receiving said clay body with the longitudinal axis thereof parallel to that of said conveyor, means for continuously driving said conveyor at a speed greater than the clay body is extruded from said machine, a manually controlled cutter provided adjacent to the conveyor at the end nearest said machine to sever a portion of the clay body therefrom, means provided in connection with said cutter for engaging the clay body and releasably securing it to said belt for movement in unison therewith, a second cutter positioned adjacent to said conveyor in spaced relation to said first cutter, means for causing the continuous operation of said second cutter, and means for synchronizing the operation of said second cutter with said conveyor to sever the clay body while on said conveyor into a plurality of pieces of equal length.

8. In mechanism for forming sagger pins, a conveyor belt and a cutting device positioned adjacent thereto, said device comprising a support, a member carried by said support for movement toward and away from said conveyor belt, means driven in timed relation to the movement of said conveyor belt for moving said member at regular intervals, a knife holder carried by and movable with said member, said holder being also movable in a plane parallel to the surface of said conveyor belt, means provided in connection with said holder and engaging said conveyor belt to impart movement from the latter to the former, and means for returning said holder to a normal position following the disengagement of said last-named means from the conveyor belt.

9. In a machine for forming clay articles, a cutting device comprising a support, a power driven shaft rotatably carried by said support, a cam secured to said shaft, a spring pressed plunger slidably carried by said support, motion transmitting means between said cam and plunger, a guide member secured to one end of said plunger, a knife blade, a knife holder mounted for movement on said guide, said holder being movable in unison with said guide member when said plunger is operated, a knife stripper slidably carried by said holder, spring means disposed between said stripper and said holder for resiliently holding these members in a predetermined relationship, and conveyor engaging feet carried by said stripper member.

10. In a machine for forming clay articles, a cutting device comprising a support, a power driven shaft rotatably carried by said support, a cam secured to said shaft, a spring pressed plunger slidably carried by said support, motion transmitting means between said cam and plunger, a guide member secured to one end of said plunger, a knife blade, a knife holder mounted for movement on said guide, said holder being movable in unison with said guide member when said plunger is operated, spring means carried by said guide member for resiliently resisting movement of the knife holder thereon, a knife stripper slidably carried by said holder, spring means disposed between said stripper and said holder for resiliently holding these members in a predetermined relationship, and conveyor engaging feet carried by said stripper member.

11. In a machine for forming clay articles of the type having a conveyor, a cutting device mounted adjacent thereto, said cutting device comprising a support, a power driven shaft rotatably carried by said support, a cam secured to said shaft, a spring pressed plunger slidably carried by said support, motion transmitting means between said cam and plunger, a guide member secured to one end of said plunger, a knife blade, a knife holder mounted for movement on said guide, said holder being movable in unison with said guide member when said plunger is operated, a knife stripper slidably carried by said holder, spring means disposed between said stripper and said holder for resiliently holding these members in a predetermined relationship, and conveyor engaging feet carried by said stripper member, said feet engaging said conveyor prior to the engagement of said knife with an article on said conveyor.

12. In a machine for forming clay articles of the type having a conveyor, a cutting device mounted adjacent to said conveyor, said cutting device comprising a support, a shaft journaled on said support, means providing for the synchronous operation of said conveyor and rotation of said shaft, a cam operated by said shaft, a spring pressed plunger slidably carried by said support and moved by said cam toward said conveyor, a guide mounted on the portion of said plunger nearest said conveyor, said guide extending in parallel relationship to said conveyor, a knife blade, a holder for said knife blade positioned for movement on said guide, said holder being moved toward said conveyor by said plunger, spring means engaging said holder to yieldably maintain it in one extremity of movement on said guide, a knife stripper mounted on said holder for movement in a plane parallel to the longitudinal axis of said plunger, spring means disposed between said holder and said stripper to yieldably maintain these members in a normal relationship, and conveyor engaging feet carried by said stripper member, said feet being disposed in closer proximity to said conveyor than said knife whereby the engagement of said feet with said conveyor will cause said knife holder and knife to move in unison with said conveyor while moving toward and away therefrom.

13. In a clay-article forming machine of the type having a conveyor, a cutting device provided adjacent said conveyor and comprising a support, a plunger mounted for vertical sliding movement on said support, guide means carried by said plunger, means for yieldably maintaining said guide means in spaced relation from said conveyor, a knife holder supported for longitudinal sliding movement on said guide means, means for moving said knife holder in the direction opposed to the travel of said conveyor, guide means on said knife holder disposed in parallel relation to the first-mentioned guide means, a stripper member positioned for movement in the guide means on said knife holder, spring means for yieldably maintaining said stripper member in its lowermost position in the guides therefor, and roughened feet members carried by said stripper member and projecting below the cutting edge of a knife operatively disposed in said knife holder.

14. Mechanism for producing a substantially transversely extending cut in an elongated body disposed in longitudinal order on a moving conveyor comprising a knife supporting mechanism, means for supporting said knife supporting mechanism for movement in a plane disposed at an angle to the longitudinal axis of the conveyor and a plane parallel to said conveyor, means for moving said knife holder in the first-mentioned plane, and means for directly engaging and coupling said knife holding mechanism to said conveyor for movement in the second-mentioned plane in unison with said conveyor.

15. Mechanism for producing a substantially transversely extending cut in an elongated body disposed in longitudinal order on a moving conveyor comprising a knife supporting mechanism, means for supporting said knife supporting mechanism for movement in a plane disposed at a right angle to the longitudinal axis of the conveyor and a plane parallel to said conveyor, means for moving said knife holder in the first-mentioned plane, and means for directly engaging and coupling said knife holding mechanism to said conveyor for movement in the second-mentioned plane in unison with said conveyor, portions of both movements of said knife holding mechanism occurring simultaneously.

16. Mechanism for producing successive cutting operations on an elongated body disposed longitudinally on a moving conveyor, a support, a plunger mounted for sliding movement on said support in a plane disposed at an angle to the longitudinal axis of the conveyor, means for successively moving said plunger, a knife holding mechanism, means for mounting said knife holding mechanism on said plunger for movement in a path extending parallel to the conveyor, conveyor engaging members yieldably supported by said knife holding mechanism, said members serving to frictionally couple said knife holding mechanism to said conveyor for movement in unison therewith, said conveyor engaging members being engaged with said conveyor prior to the engagement of the knife with the body on the conveyor and disengaged therefrom after the knife is withdrawn from the body.

17. Mechanism for producing successive cutting operations on an elongated body disposed longitudinally on a moving conveyor, a support, a plunger mounted for sliding movement on said support in a plane disposed at an angle to the longitudinal axis of the conveyor, means for successively moving said plunger, a knife holding mechanism, means for mounting said knife holding mechanism on said plunger for movement in a path extending parallel to the conveyor, conveyor engaging members yieldably supported by said knife holding mechanism, said members serving to frictionally couple said knife holding mechanism to said conveyor for movement in unison therewith, said conveyor engaging members being engaged with said conveyor prior to the engagement of the knife with the body on the conveyor and disengaged therefrom after the knife is withdrawn from the body, and resilient means for preventing elevation of the conveyor when said engaging members are separated therefrom.

18. The method of forming sagger pins comprising the steps of extruding a strand of clay onto a moving conveyor belt, the rate of linear travel of the belt being greater than the rate of linear travel of said strand through the extrusion die, severing a portion of said strand therefrom to cause it to move in unison with said conveyor belt, and then cutting the strand transversely into a plurality of pin-forming sections while on said belt without interrupting the travel of the clay strand with the conveyor belt.

19. The method of forming sagger pins, comprising extruding a clay body to form a plurality of parallel strands, depositing said strands longitudinally on a moving conveyor travelling at a linear speed greater than the linear rate of extrusion of said strands, cutting the strands while the latter are on said conveyor into strip lengths whereby to cause such lengths to travel in unison with said conveyor and at the same rate of lineal travel, and then cutting the strip lengths at spaced longitudinal intervals into shorter pin-forming lengths while on said conveyor without interrupting the bodily movement of the strip and pin lengths in unison with and at the same rate of longitudinal travel as said conveyor.

20. The method of forming sagger pins which comprises the steps of extruding a plurality of parallel strands of clay onto a conveyor, moving said conveyor continuously at a linear speed greater than the linear rate of extrusion of the clay strands, the longitudinal axes of said strands being in parallel relationship to the longitudinal sides of the conveyor, simultaneously severing the strands from the clay bodies undergoing extrusion to cause the strands to move in unison with the conveyor, and then successively producing a plurality of simultaneous transverse cuts on the strands while the same are on said conveyor and moving in unison therewith.

21. In mechanism for forming sagger pins, a belt-like conveyor, a cutting device positioned adjacent to said conveyor, said device comprising a knife mounted for movement into and out of engagement with said conveyor, means for moving said knife into and out of engagement with said conveyor in timed relation to the movement of said conveyor, and means movable with and relative to said knife for engaging said conveyor to move said knife in unison with said conveyor during movement of said knife into and out of engagement with said conveyor.

HOWARD S. ORTH.
CLAIR R. OBERST.
WILLIAM E. CRAMER.